US007359550B2

(12) United States Patent
Brand (10) Patent No.: US 7,359,550 B2
(45) Date of Patent: Apr. 15, 2008

(54) INCREMENTAL SINGULAR VALUE DECOMPOSITION OF INCOMPLETE DATA

(75) Inventor: Matthew E. Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 866 days.

(21) Appl. No.: 10/124,902

(22) Filed: Apr. 18, 2002

(65) Prior Publication Data

US 2003/0200097 A1 Oct. 23, 2003

(51) Int. Cl.
*G06K 9/00* (2006.01)
(52) U.S. Cl. .................... 382/181; 704/270
(58) Field of Classification Search ............. 704/270; 382/181
See application file for complete search history.

(56) References Cited

U.S. PATENT DOCUMENTS 5,615,288 A * 3/1997 Koshi et al. ............... 382/248
5,638,337 A * 6/1997 Priest ......................... 367/27
5,768,443 A * 6/1998 Michael et al. ............ 382/294
2001/0044719 A1* 11/2001 Casey ........................ 704/245
2002/0083041 A1* 6/2002 Achlioptas et al. ........... 707/1
2002/0186895 A1* 12/2002 Gloersen .................... 382/285

* cited by examiner

*Primary Examiner*—Daniel Abebe
(74) *Attorney, Agent, or Firm*—Dirk Brinkman; Clifton D. Mueller; Gene V. Vinokur (57) ABSTRACT

A method models data values acquired by measuring a natural phenomena. Samples are acquired of the natural phenomena, each sample is arranged as a vector c of the data values. Some of the data values may be missing. The vectors c are decomposed into five matrices, respectively, a subspace $U_{p \times r}$, singular values $s_{r \times 1}$, an encoding $V_{q \times r}$, a subspace rotation $U'_{r \times r}$, an encoding transform $V'_{r \times r}$, where p indicates the number of discrete data values in each sample, q is a number of samples, and r is a rank of a decomposition of the data values. The five matrices can then be multiplied according to $UU' \mathrm{diag}(s) V'^T V^T$ to obtain a best linear approximation of the natural phenomena for any value of r less than both p and q, where $^T$ is a matrix transpose operator.

19 Claims, 9 Drawing Sheets

INCREMENTAL SINGULAR VALUE DECOMPOSITION OF INCOMPLETE DATA

FIELD OF THE INVENTION

This invention relates generally to measuring and analyzing real-world data, and more particularly, to applying singular value decompositions to incomplete measured data.

BACKGROUND OF THE INVENTION

Many natural phenomena can be faithfully modeled with multi-linear functions, or closely approximated as such. Multi-linearity means that a high-dimensional matrix of measurements of natural phenomena effects can be factored into low-rank matrices indicating presumed causes or characterizations of the phenomena.

Example applications include the combination of lighting and pose, see Tenenbaum et al., "Separating style and content with bilinear models," *Neural Computation,* 12:1247-1283, 2000, shape and motion, see Irani et al., "Factorization with uncertainty, *Proc. European Conf. Computer Vision,* 2000, image formation, mixing of sources in acoustic recordings, see Casey, "MPEG-7 sound-recognition tools," *IEEE Transactions on Circuits and Systems for Video Technology,* 11(6), June 2001 and U.S. Pat. No. 6,321,200 issued to Casey on Nov. 20, 2001, "Method for extracting features from a mixture of signals," consumer purchasing data, Sarwar et al., "Application of dimensionality reduction in recommender system—a case study," *ACM WebKDD 2000 Web Mining for E-Commerce Workshop.* ACM Press, 2000, and word associations in collections of documents, see Berry et al., "Large scale singular value computations," *International Journal of Supercomputer Applications,* 6:13-49, 1992, Zha et al., "On updating problems in latent semantic indexing," *SIAM Journal on Scientific Computing,* 21(2):782-791), 1999.

Figure 1:
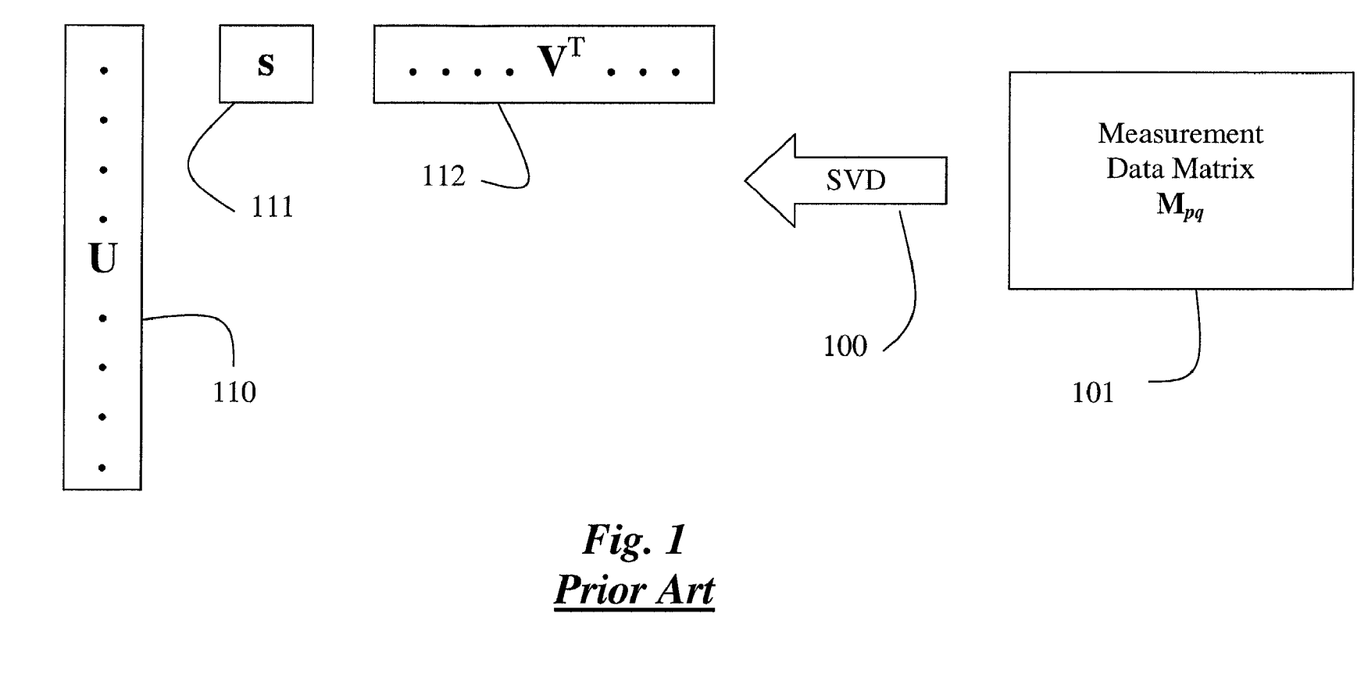
FIG. 1 is a block diagram of a singular value decomposition (SVD) according to the prior art.

As shown in FIG. 1, singular value decomposition (SVD) 100 is the best known and widely used factoring method, see Golub et al., "*Matrix Computations,*" Johns Hopkins U. Press, 1996. The prior art SVD method 100 provides a bi-linear factoring of a multi-linear data matrix $M_{p \times q}$ 101, into a subspace $U_{p \times r}$ 110, diagonal singular values $s_{r \times 1}$ 111, and an encoding $V^T_{r \times q}$ 112, where p is the number of samples (columns) in the matrix, and q is the number of values (rows) in each sample, thus, p and q are the dimensions of the matrix M 101, r is the rank of the decomposition, and $^T$ is the transform. This decomposition is generally expressed as:

$$U_{p \times r} diag(s_{r \times 1}) V^T_{r \times q} \overset{SVD_r}{\longleftarrow} M_{p \times q}, r \leq \min(p, q) \quad (1)$$

where U and V are orthogonal matrices whose columns and rows, give a linear basis for M's columns and rows, respectively, and s is a diagonal matrix, in short: $U diag(s) V^T \leftarrow M$.

Figure 2:
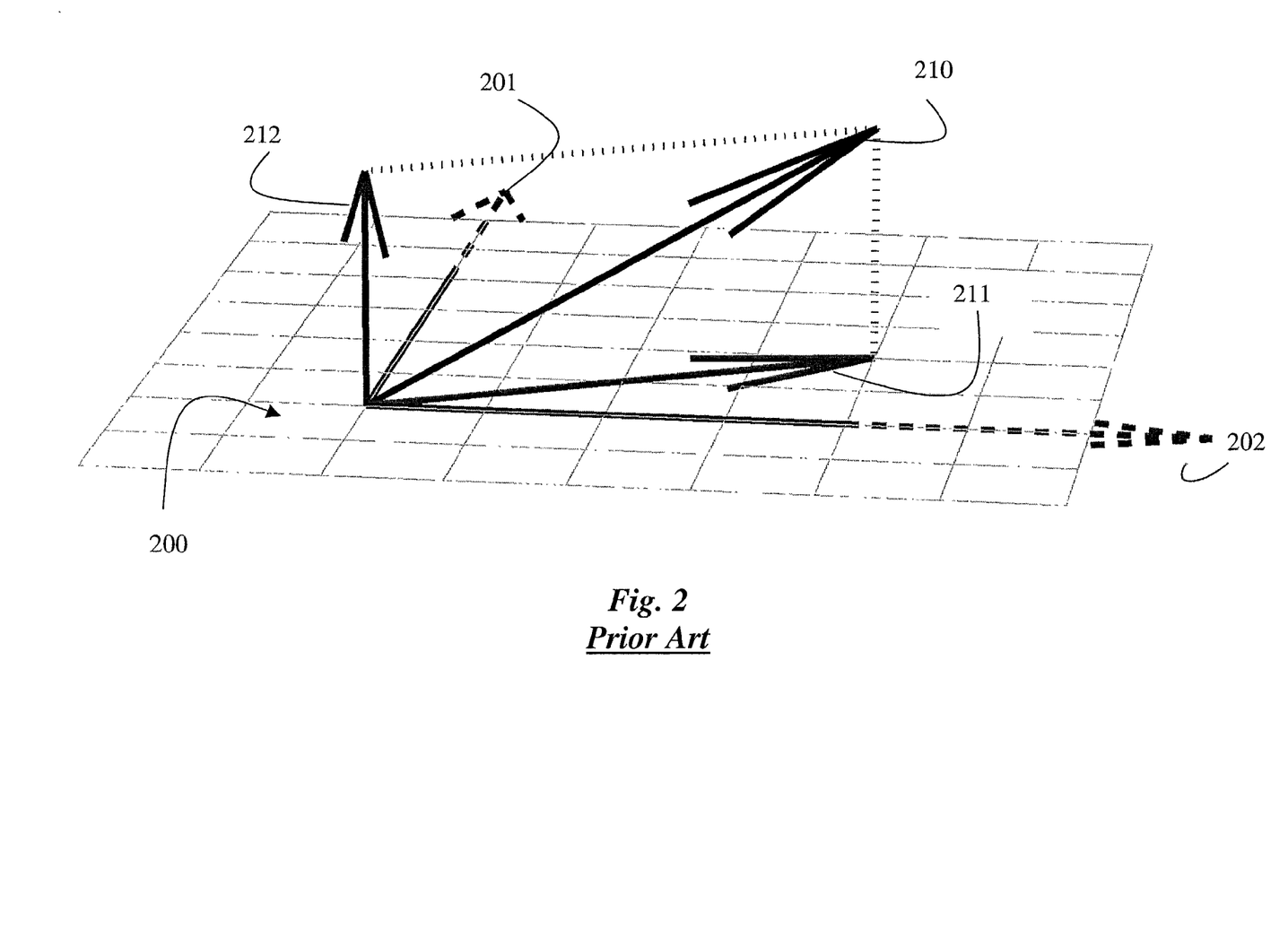
FIG. 2 is a graph of a prior art SVD on a vector.

FIG. 2 shows the relation of a three dimensional vector 210 to a two-dimensional subspace 200 having axes 201-202. The vector 210 is decomposed into a component 211 within the subspace 200, and remainder component orthogonal (perpendicular) to the subspace 200. The subspace component 211 gives the location of the vector 210 in the subspace. When the modeler has high confidence in the subspace, the subspace component is understood to be the informative part of the signal and the orthogonal component is considered to be noise. Otherwise, the SVD can be updated to incorporate the vector. The subspace component 211 causes the singular vectors to be rotated, while the orthogonal remainder component 212 increases the dimensionality of the subspace (rank of the SVD).

For low-rank phenomena, $r_{true} \ll \min(p, q)$, implying a parsimonious explanation of the measured data. Because $r_{true}$ is often unknown, it is common to wastefully determine a large $r_{approx} \gg r_{true}$ SVD, and estimate an appropriate smaller value $r_{empirical}$ from the distribution of singular values in s. All but $r_{empirical}$ of the smallest singular values in s are then zeroed to give a "thin" truncated SVD that closely approximates the measured data. This forms the basis of a broad range of data analysis, dimensionality reduction, compression, noise-suppression, and extrapolation methods.

In the prior art, the SVD of is usually determined by a batch method that consumes $O(pq^2 + p^2 q + q^3)$ amount of time, meaning that all the data must be processed at once, and SVDs of very large sets of data are essentially unfeasible. The well known Lanczos method yield thin SVDs in $O(pqr^2)$ time, however, $r_{true}$ needs to be known in advance because the Lanczos method is known to be inaccurate for lower ranked singular values.

A more pressing problem is that prior art SVD methods requires complete data, whereas in many real-world applications, some parts of measured data are not available, uncertain, contaminated, otherwise unreliable or non-stationary, generally "incomplete data." Consequently, a single missing value forces the modeler to discard an entire row or column of the data in the matrix before applying the SVD.

The incomplete data may be imputed from neighboring values, but such imputations typically mislead the SVD away from the most parsimonious, i.e., low-rank, decompositions.

SVD updating is generally based on the Lanczos method, symmetric eigenvalue perturbations, or identities similar to equation 2 below, see Berry et al., Businger, "Updating a singular value decomposition," *BIT,* 10:376-385, 1970, Chandrasekaran et al., "An eigenspace update algorithm for image analysis," *Graphical models and image processing: GMIP,* 59(5):321-332, 1997, Gu et al., "A stable and fast algorithm for updating the singular value decomposition," Tech. Report YALEU/DCS/RR-966, Department of Computer Science, Yale University, New Haven, Conn., 1993, and Zha et al. Zha et al. use such an identity. However, their update is approximate and requires a dense SVD. Chandrasekaran et al. begin similarly, but their update is limited to one set of single vectors and is vulnerable to loss of orthogonality.

None of the prior art methods contemplates incomplete data, except insofar as they can be treated as zeros, e.g., see Berry, which is inappropriate for many applications. In batch-SVD contexts, incomplete data are usually handled via subspace imputation. A parameterization of the space of SVDs that allows global marginalization over all missing values is not yet known.

There is a widely accepted expectation-maximization procedure for imputation. The SVD is applied on all complete columns, and regressing on incomplete columns against the SVD to impute incomplete or missing data. Then, the "imputed" complete data are re-factored and re-imputed until a fixed point is reached, see e.g., Troyanskaya et al., "Missing value estimation methods for DNA microarrays," *BioInformatics,* 17:1-6, 2001. That procedure is extremely slow operating in quartic time, and only works when a small amount of data are incomplete. The procedure has the further problem that the imputation does not minimize the effective rank.

Other procedures simply fill incomplete data with zeros, or with column means times plus or minus 1, e.g., see Sawar et al.

In the special case where the matrix M is nearly dense, its normalized scatter matrix $\Sigma_{m,n} \doteq <M_{i,m} M_{i,n}>i$ can be fully dense due to fill-in. In that case, $\Sigma$'s eigenvectors are M's right singular vectors, see Jackson, "A user's guide to principal components," Wiley, 1991. However, that method does not lead to the left singular vectors, and it often does not work at all because the $\Sigma$s are frequently incomplete as well, with undefined eigenvectors.

Therefore, it is desired to update an SVD by adding rows or columns of data, which are unavailable, uncertain, contaminated with correlated or colored noise, non-stationary, or otherwise incomplete. In addition, it is desired to handle incomplete data in a manner that minimizes rank. Furthermore, it is desired to perform the SVD in less time with less memory than prior art full-data SVD methods so that SVD updating can be done on-line on streaming data, while still producing informative results leading to a more parsimonious factoring of incomplete data.

SUMMARY OF THE INVENTION

The invention provides an incremental singular value decomposition (SVD) for incomplete data. The SVD can be developed on-line as data stream in. The method can also handle arbitrary missing or untrusted values, correlated uncertainty across rows or columns of the measurement matrix, and user priors.

Because incomplete data do not uniquely specify the SVD, the method according to the invention selects data having a minimal rank. Remarkably, the incremental SVD method according to the invention has better time and space complexity than highly optimized batch SVD methods of the prior art.

In cases of incomplete data, the incremental SVD method produces factorings of a lower rank and residual than the batch SVD method applied to standard missing-data imputations.

The method can be applied to applications such as computer vision, consumer preference prediction, and audio feature extraction. In computer vision, the incremental SVD can be used to develop an efficient and unusually robust subspace-estimating flow-based tracker, and to non-iteratively handle occlusions and missing points in structure-from-motion factorizations.

More particularly, a method models data values acquired by measuring a natural phenomena. Samples are acquired of the natural phenomena, each sample is arranged as a vector c of the data values. Some of the data values may be missing.

The vectors c are decomposed into five matrices, respectively, a subspace $U_{p \times r}$, singular values $s_{r \times 1}$, an encoding $V_{q \times r}$, a subspace rotation $U'_{r \times r}$, an encoding transform $V'_{r \times r}$, where p indicates the number of discrete data values in each sample, q is a number of samples, and r is a rank of a decomposition of the data values.

The five matrices can then be multiplied according to $UU'\text{diag}(s)V'^T V^T$ to obtain a best linear approximation of the real-world phenomena for any value of r less than both p and q, where $^T$ is a matrix transpose operator.

DETAILED DESCRIPTION OF THE PREFERRED EMBODIMENT

SVD Structure

Figure 3:
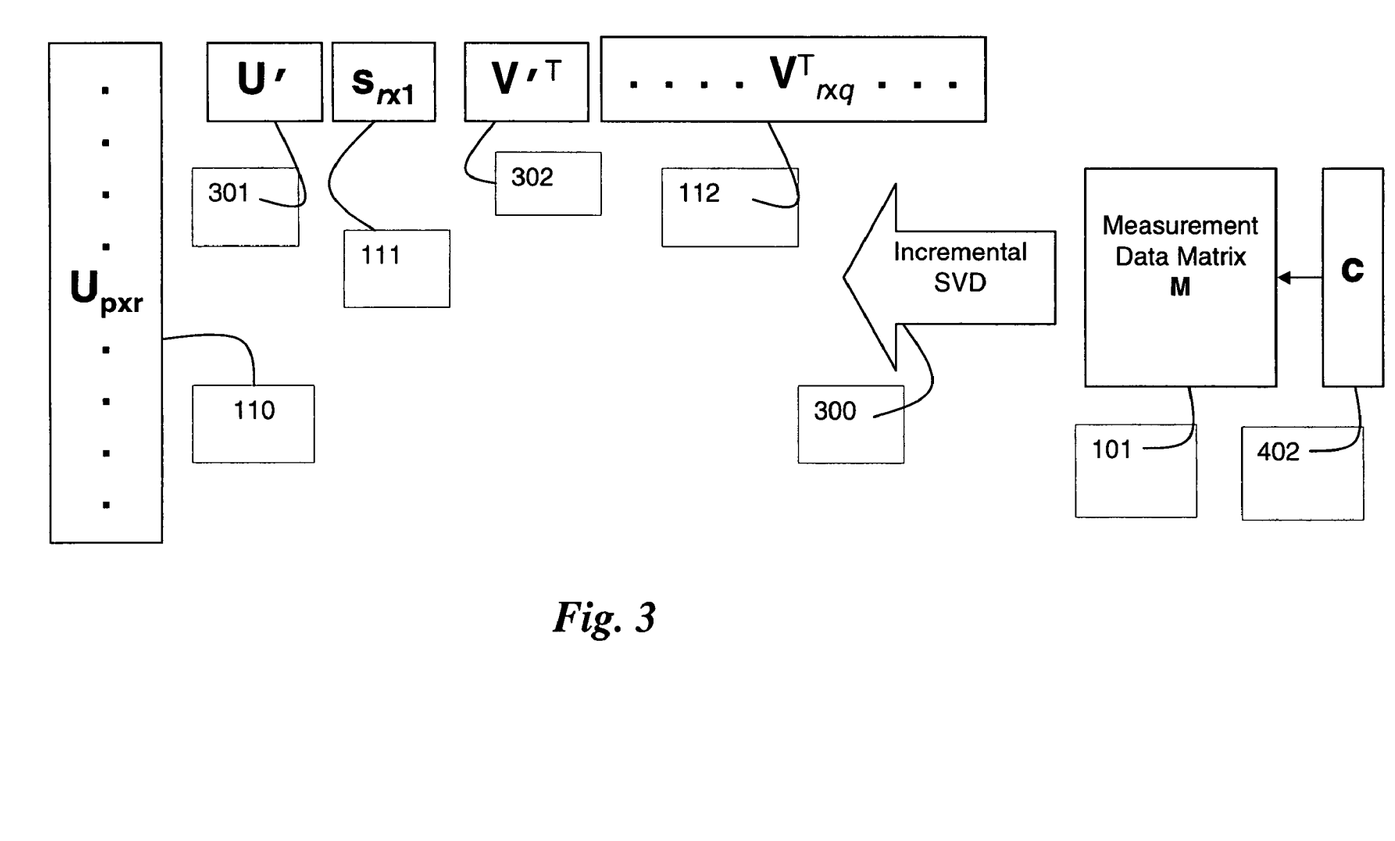
FIG. 3 is a block diagram of a SVD according to the invention.

FIG. 3 shows an SVD 300 according to the invention. My invention begins with a multi-variate measurement data matrix M 101, which initially is empty or the null set. The matrix M can be stored in a memory or acquired in the form of streaming data. Measurements or samples m of a natural phenomena are acquired from a natural phenomena, see FIG. 4. As a characteristic of the natural phenomena, some of the data are often be missing, uncertain, contaminated with correlated or colored noise, non-stationary, or otherwise "incomplete." My invention provides an incremental SVD method that produces factorings of a lower rank and smaller residual for incomplete data than the prior art.

The SVD 300 according to my invention produces a subspace $U_{p \times r}$ 110, singular values $S_{r \times 1}$ 111, and an encoding $V^T_{r \times q}$ 112, where p and q are the dimensions of the matrix M 101, r is the rank of the decomposition, and $^T$ is a matrix transpose operator. In addition, the SVD 300 produces a subspace rotation U' 301 and a encoding transform $V'^T$ 302. A matrix product UU' defines the subspace, i.e., a set of orthogonal axes, that best spans all measurements M 101. The singular values s 111 indicate how broadly the measurements are distributed along each axis. A matrix produce VV'diag(s) gives locations of each measurements within the subspace 110.

In this novel form, the SVD 300 can be determined in less time and with less memory. This enables on-line processing of streaming data for updating the SVD. Furthermore, the SVD 300 can operate on incomplete data.

SVD Initialization

Figure 4:
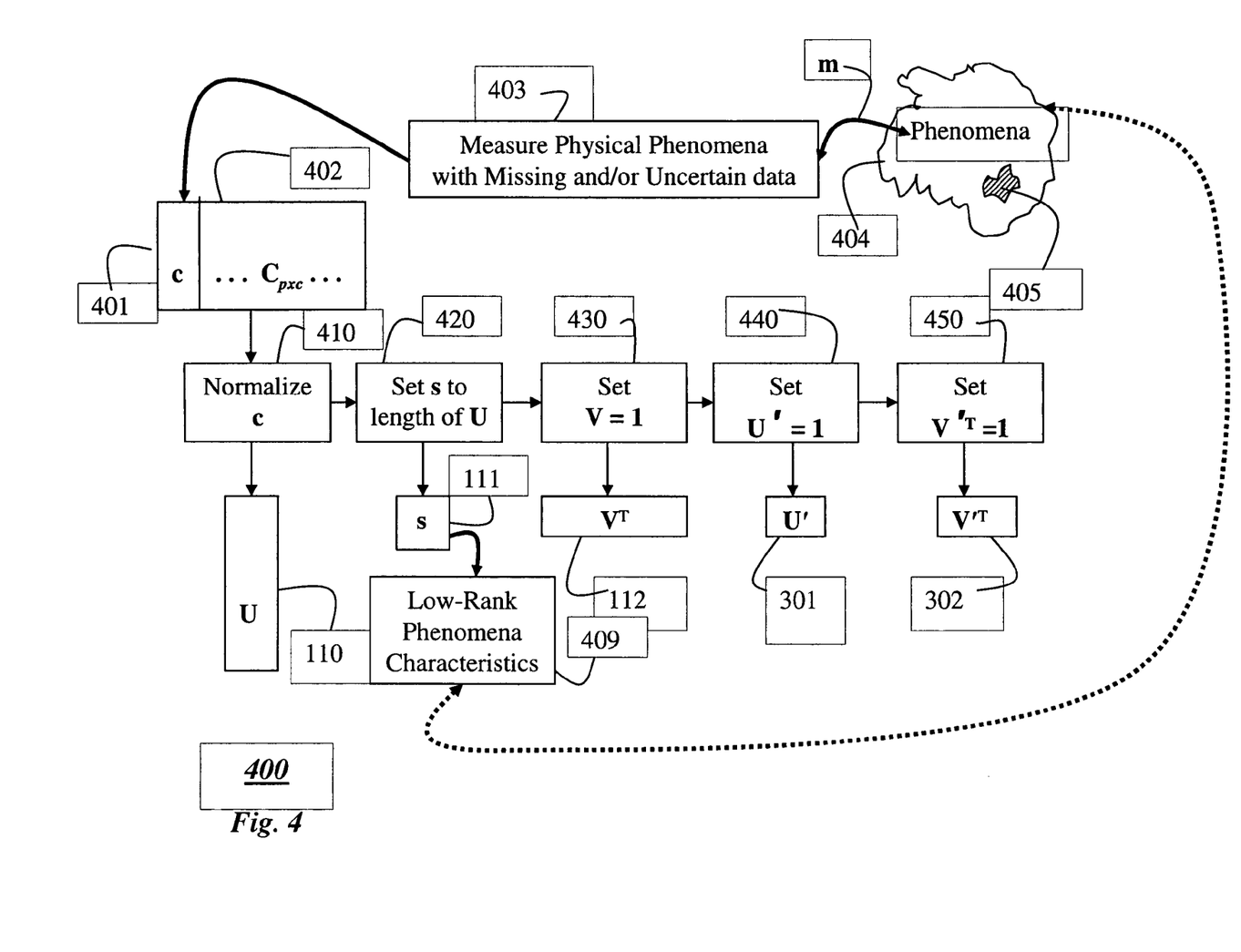
FIG. 4 is a block diagram of a method for generating an initial state of the SVD of FIG. 3.

FIG. 4 shows how the initial SVD of FIG. 3 is generated 400, presuming that the matrix M 101 is initially empty.

New samples m are acquired 403 of a physical phenomena 404 with missing or uncertain data 405. Each sample is arranged in the form of a column vector c 401. The goal is to update the SVD with the vector c 401 without substantially increasing the amount of storage required for the SVD. Multiple new samples can be accumulated in a multi-variate matrix $C_{p\times c}$ 402, where p is the number of values in each sample, and c is the number of samples or columns c 401. In contrast with the prior art, the samples or columns are processed one at a time or in small batches, hence, my method is incremental, and can be used for streaming data, and processed on-line.

I begin by normalizing 410 the sample vector c 401 to obtain the initial subspace U 110. The singular value matrix s 111 is initialized 420 to be a scalar value specifying a length of the sample vector c 401. I also set 430, 440, and 450 the encoding V 111, the subspace rotation U' 301, and the encoding transform $V'^T$ 302 all to one. Now, the singular values 111 best characterize 409 the physical phenomena with a lowest possible rank.

Obviously, a single sample is insufficient to fully characterize a complex phenomena. Therefore, in practical applications many samples, perhaps hundreds or thousands, are acquired, and the goal is to incrementally update the SVD with the new samples.

Incremental Updating the SVD

Figure 5:
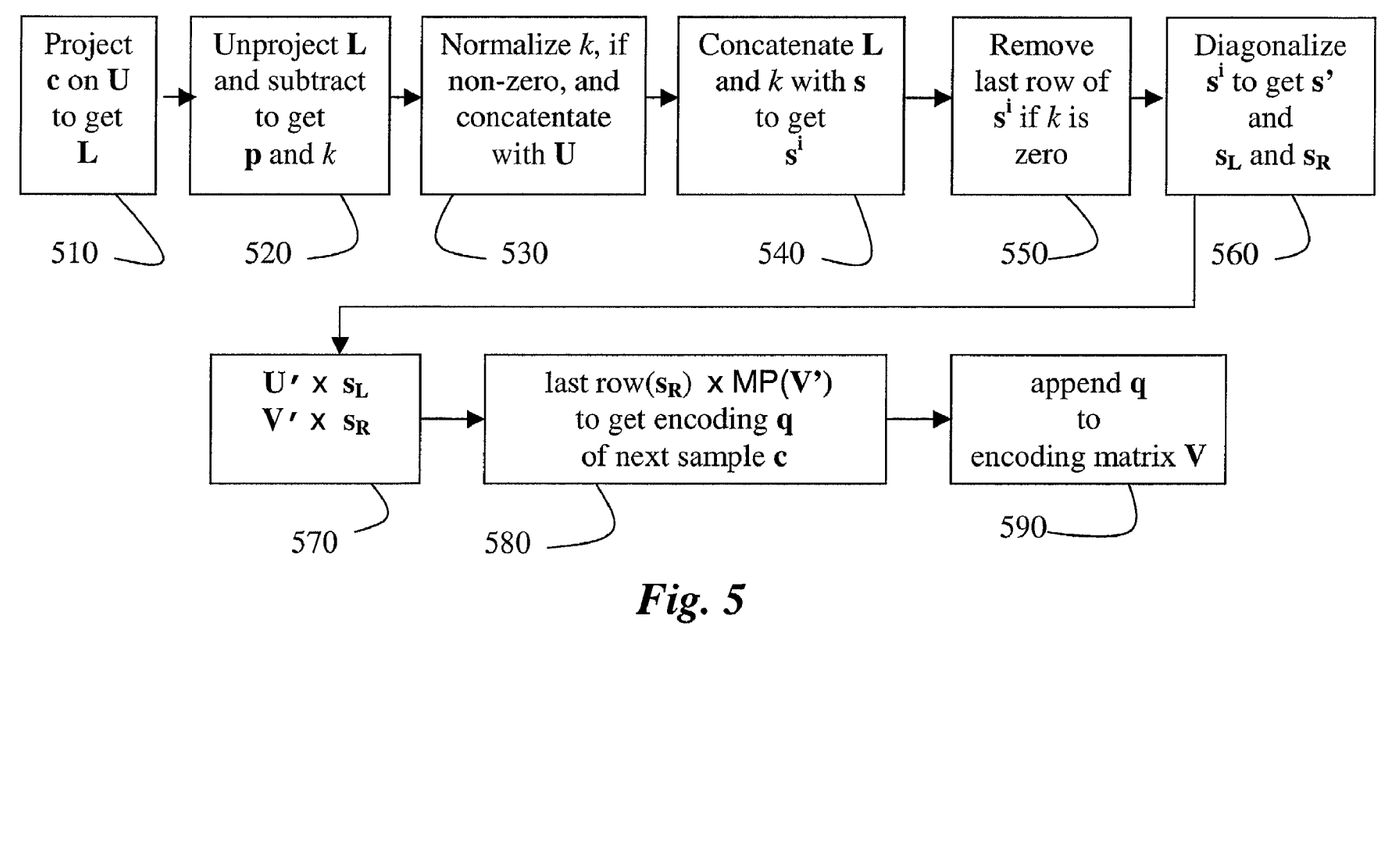
FIG. 5 is a block diagram of a method for updating the SVD of FIG. 3.

FIG. 5 shows the steps for updating the SVD for subsequent samples. First, I project 510 each next sample vector c 401 onto the subspace U 110 to obtain a location L of the vector in the subspace.

Next, I unproject 520 the location L and subtract the result from the sample vector c 401 to obtain a remainder p of the vector outside the subspace, and a length k of the remainder.

If the length k is non-zero, I normalize the remainder p and concatenate this to the subspace U 110 in step 530.

Then, I concatenate the location L and the length k of the remainder to the singular value matrix s 111 to obtain an interim singular value matrix $s^i$ in step 540.

If the length k is zero, the last row of the interim singular value matrix $s^i$ is removed 550.

Next, I diagonalize 560 the interim matrix $s^i$ to obtain an updated singular value matrix s', and a left and right rotation ($s_L$ and $s_R$) of the updated singular value matrix s'.

Following this, I multiply 570 the subspace rotation U' 301 by the subspace rotation $s_L$, and the encoding transform V' 302 by the right rotation $s_R$ to update the subspace rotation U' 301, and the encoding transform $V'^T$ 302.

Then, I multiply 580 the last row of the right rotation $s_R$ by the Moore-Penrose (MP) pseudo-inverse of the old encoding transform V' 302 to obtain the encoding q of the next sample c.

Last, I append 590 this encoding q to the encoding matrix V 112.

Note, the update method of FIG. 5 degenerates to the initialization method of FIG. 4 when U is a p×0 matrix, and all other matrices are 0×0.

Implementation Details

I define $L \doteq U\backslash C = U^T C$ as the projection 510 of the multivariate matrix C 402 onto the subspace U 110, also known as its "eigen-coding," where a matrix $H \doteq (I-HH^T)C = C-UL$ is a component of C orthogonal to the subspace spanned by U, and I is the identity matrix. Also, a matrix J is an orthogonal basis of H, and $K \doteq J\backslash H = J^T H$ is a projection of the matrix C onto the bias that is orthogonal to the subspace U. For example, $JK \xleftarrow{QR} H$ is a QR-decomposition of H. Consider the following identity:

$$[U\ J] \begin{bmatrix} diag(s) & L \\ 0 & K \end{bmatrix} \begin{bmatrix} V & 0 \\ 0 & I \end{bmatrix}^T = [U(I-UU^T)C/K] \begin{bmatrix} diag(s) & U^T C \\ 0 & K \end{bmatrix} \begin{bmatrix} V & 0 \\ 0 & I \end{bmatrix}^T \quad (2)$$

$$= [U\ diag(s)V^T C] = [M\ C]$$

Like the prior art SVD 100, the left and right matrices in the product are unitary and orthogonal. The middle matrix Q is diagonal with a c-column border. To update the SVD, The matrix Q is diagonalized 540. Let $$U' diag(s')V'^T \xleftarrow{SVD} Q \quad (3)$$

$$U'' \leftarrow [U\ J]U';\ s'' \leftarrow s';\ V'' \leftarrow \begin{bmatrix} V & 0 \\ 0 & I \end{bmatrix} V' \quad (4)$$

Then, the updated SVD is

To add rows, I swaps U for V, and U" for V".

$$U''\ diag(s'')V''^T = [U diag(s)V^T C] = [MC]$$

In practice, some care must be taken to counter numerical error that may make J and U not quite orthogonal. Applying a modified Gram-Schmidt orthogonalization to U, when a norm of K is large relative to machine precision, makes the method numerically robust. A much more efficient scheme is described below.

Automatic Truncation

A volume of C 402 that is orthogonal to U 110 is defined as $\upsilon \doteq \sqrt{det(K^T K)}$. If $\upsilon$ is less than $\epsilon$ for a small $\epsilon$ near the limits of machine precision, then J has a zero norm, because there is no orthogonal component, else J is contaminated by numerical or measurement noise. In this case, the noise can be suppressed by setting $K \leftarrow 0$ prior to the SVD in equation 3. Because the resulting SVD has r rather than r+1 singular values, equation 4 can be replaced with the truncated forms $$U'' \leftarrow UU'_{1:r,1:r};\ s'' \leftarrow s'_{1:r};\ V'' \leftarrow V'_{:,1:r}.$$

This automatically sizes the SVD to the effective rank of the data matrix.

To explicitly suppress measurement noise, the completed update is truncated to suppress singular values below a noise threshold, derived from the user's knowledge of noise levels in the measurements of the natural phenomena 404.

The update procedure enables online SVDs and SVDs of data sets whose size defeats non-incremental SVD method of the prior art. The update can be used to add individual vectors, batches of vectors, or to merge SVDs from partitions of the data.

Fast Incremental SVD of Low-Rank Matrices

A useful special case is when c=C is the single column vector 401, for which a scalar value $k=K=\|c-UU^Tc\|$, and the vector $j=J=(c-UU^Tc)/k$ can be determined quickly. In practice, some care should be taken in the order of operations in determining k to get the most accurate result from floating point computations. I use $k \leftarrow c^Tc - 2L^TL + (UL)^T(UL)$.

Because the set M of measured data is incomplete, it is necessary to add rows and/or columns to determine the full SVD. I first acquire 402 the measurement m $\in$M, and set $s \leftarrow \|m\|$, $U \leftarrow m/\|m\|$, $V \leftarrow 1$. Then, I iterate the update procedure above with truncation. The total procedure takes $O(pqr^2)$ time, which is essentially linear in the number of elements of the set M. This can be substantially faster than the $O(pq^2)$ time of the prior art batch SVD, when the rank $r \ll q$.

As an advantage over the prior art Lanczos methods, the method according to the invention can be performed in real-time as streaming the data are acquired. Furthermore, the memory storage requirements are significantly reduced from $O(pq)$, i.e., the size of the data, to $O(r(p+q+r))$, the size of the results.

Preserving Orthogonality and Reducing Complexity

Because U 110 and V 112 are large thin matrices, repeatedly rotating their column spaces makes loss of orthogonality through numerical error a problem. Instead of updating the large matrices, I keep U, V, U', V' separate and only update the small matrices U' and V', with U and V increasing in size strictly by $$U_{p \times r} U'_{r \times r} diag(s_{r \times 1}) V'^T_{r \times r} V^T_{q \times r} \stackrel{SXD_r}{\longleftarrow} M,$$

concatenations. In this faster incarnation of the SVD updating, I build an extended SVD, with orthogonal U, U', UU', and VV'. The large outer matrices are built by appending columns to U and rows to V, while rotations of the subspace are handled by transforms of the much smaller U' and V' matrices. This makes the update much faster and more robust to numerical error.

Let Q and j be defined as above, and let A, and B diagonalize Q as Adiag(s)

$$B \stackrel{SVD}{\longleftarrow} Q.$$

The left-hand side is updated $U' \leftarrow U'A$ when the rank does not increase, otherwise $$U' \leftarrow \begin{bmatrix} U' & 0 \\ 0 & 1 \end{bmatrix}, U \leftarrow [U, j].$$

Due to its small size, U' loses orthogonality very slowly. Numerical error can be minimized by occasionally re-orthogonalizing U', via a modified Gram-Schmidt orthogonalization, when the inner product of its first column with its last column is more than some small $\epsilon$ away from zero.

The right side is somewhat more complicated because rows are appended to V while guaranteeing that VV' remains orthogonal. To do so, the pseudo-inverse V'+ is determined and updated. Let r be the rank of the SVD prior to the update.

When the rank increases, the encoding V update is $$V \leftarrow \begin{bmatrix} V' & 0 \\ 0 & 1 \end{bmatrix}, \text{then } V' \leftarrow \begin{bmatrix} V' & 0 \\ 0 & 1 \end{bmatrix} B, \text{then } V'^+ \leftarrow B^T \begin{bmatrix} V'^+ & 0 \\ 0 & 1 \end{bmatrix}.$$

When the rank does not increase, I split $$B \leftarrow \begin{bmatrix} W \\ w \end{bmatrix},$$

where matrix $W \doteq B_{(1:r, 1:r)}$ is a linear transform that is applied to V', and the row-vector $w \doteq B_{(1+r, 1:r)}$ is the eigenspace encoding of the new data vector. This update is $$V' = \leftarrow V'W, \text{then } V'^+ \leftarrow W^+ V'^+, \text{then } V \leftarrow \begin{bmatrix} V \\ V'^+ w \end{bmatrix}.$$

It can be verified that $V_{new} V'_{new}$ is identical to the first r columns of $$\begin{bmatrix} V_{old} & V'_{old} \\ 0 & 1 \end{bmatrix} B.$$

Remarkably, $W^+$ can be determined in $O(r^2)$ time using an identity $$W^+ = W^T + (w^T/(1-ww^T)))(wW^T).$$

This eliminates the costliest steps of the update, rotation and re-orthogonalization of U and V, and only requires that U' is kept orthogonal. The time complexity falls to $O(pr^2)$ for the r rank-increasing updates, and to $O(pr+r^3)$ for the q-r non rank-increasing updates. The overall complexity is $O(pqr+qr^3)=O(pqr)$, assuming that the rank is small relative to the dimensionality of the samples, specifically $r=O(\sqrt{p})$.

Thus, a high-dimensional low-rank matrices, my invention provides effectively for updating the SVD in linear-time.

The increase in performance is considerable even for very low ranks. For example, factoring a rank-10 1000×1000 random matrix takes less than three seconds on a PC. The same operation takes a hundred seconds using a highly optimized Lanczos SVD, for the top ten singular values. A standard SVD takes over two-hundred seconds.

Subspace Tracking of Measured Data

For non-stationary data streams, as in structure-from-motion tracking in videos, the best one can do is to track an evolving subspace U. In my incremental SVD method, this is accomplished neatly and inexpensively between updates by decaying the singular values $s \leftarrow \gamma s$, for $0 < \gamma < 1$. All updates of V are simply dropped.

Incomplete Data

Here, the problem to be solved is to add a vector c with incomplete data. An incomplete vector has both known and unknown data values. In my implementation, these are indicated by setting entries in c to the IEEE754 floating point value NaN (not-a-number). Partition c into $c_\circ$ and $c_\bullet$, vectors of the known and unknown values in c, respectively, and $U_\circ$ and $U_\bullet$ are the corresponding rows of U. Imputation of the missing values via the normal equation $$\hat{c}_\circ \leftarrow U_\circ (U_\bullet^T U_\bullet)^{-1}(U_\bullet^T c_\bullet) = U_\bullet (U \backslash c_\bullet), \quad (5)$$

yields an imputed complete vector $\hat{c}$ that is closest to the subspace spanned by U. Substituting this into the Q matrix yields $$Q = \begin{bmatrix} diag(s) & U^T\hat{c} \\ 0 & k \end{bmatrix} = \begin{bmatrix} diag(s) & U\bullet\backslash c\bullet \\ 0 & \|c\bullet - U\bullet(U\bullet\backslash c\bullet)\| \end{bmatrix}, \quad (6)$$

where $U^T>\hat{c}$ is the projection of the vector onto the subspace U and k is a distance of the vector to that subspace. The multiplication in equation (5) can be weighted with the singular values s to maximize a marginal likelihood (probability) of the imputation. In the worst case, this raises the per-update complexity to $O(pr^3)$. However, in practice, the per-update run time is closer to $O(pr^2)$.

Minimizing Rank Growth

The importance of the imputation in equation 5 is that it minimizes the rank k of the SVDF, thus controlling the effective rank of the updated SVD. Therefore, it can be stated that minimizing the rank k maximizes the concentration of variance in the top singular values, for the following reason.

The pre-update singular values are denoted as $s_i \in s$, and the elements of the Q matrix are $Q_{i,j} \in Q$, and the post-update singular values of Q are $\sigma_i$, I compute the determinant of the new singular value matrix:

$$k\Pi_i^r s_i^2 = \Pi_i^{r+1} Q_{i,i}^2 = \det(Q^T Q) = \Pi_i^{r+1} \sigma_i^2 = \exp 2\Sigma_i^{r+1} \log \sigma_i. \quad (7)$$

The second equality follows from the special sparsity structure of Q. This shows that minimizing k is equivalent to minimizing the log-volume of the post-update singular value matrix, which is half the log-volume of scatter matrix of the completed data. Because the amount of total variance in the singular value matrix is lower-bounded by the variance in the known data values, by the log-sum inequality, the only way to minimize the log-volume is to concentrate the variance in a few dominant singular values. Consequently equation 5 minimizes growth of the effective rank in the updated SVD.

Factoring Extremely Sparse Data

For each incomplete data element in the measurements M 101, there is a closed curve of SVDs consistent with the complete elements. The imputed update selects the SVD update with the smallest effective rank. However, in iterative use, this constitutes a greedy policy whose results depend on the order in which data are processed. If the entire data set is available, then the rows and columns can be re-ordered so that the matrix is densest in the one corner, e.g., the upper left. The SVD is then "grown" out of that corner by updating with partial rows and columns until the entire matrix is covered. This defers imputations until they can be well constrained by the available data. It also enables factorings of extremely sparse data sets.

Figure 6:
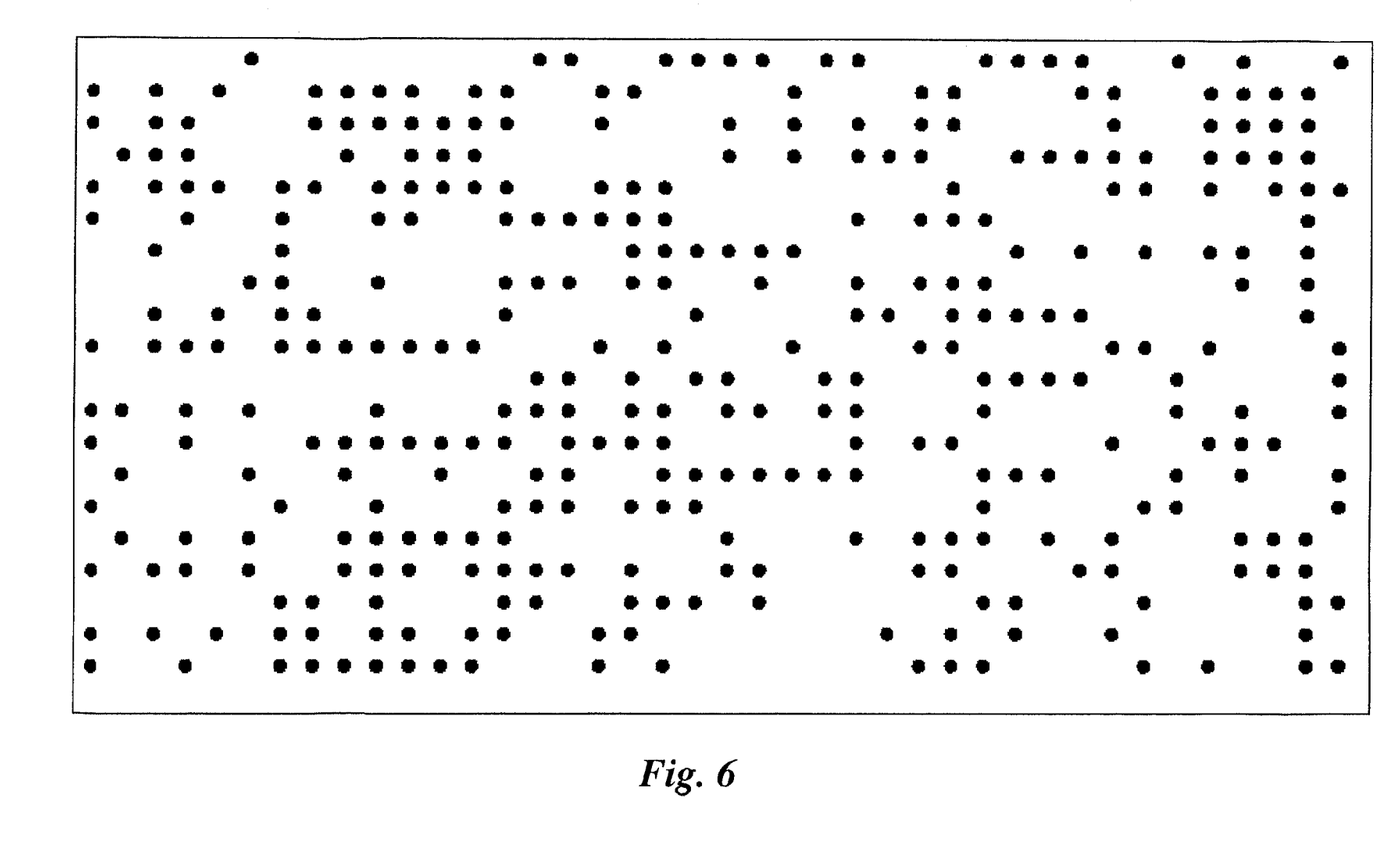
FIG. 6 is a block diagram of incomplete data.
Figure 7:
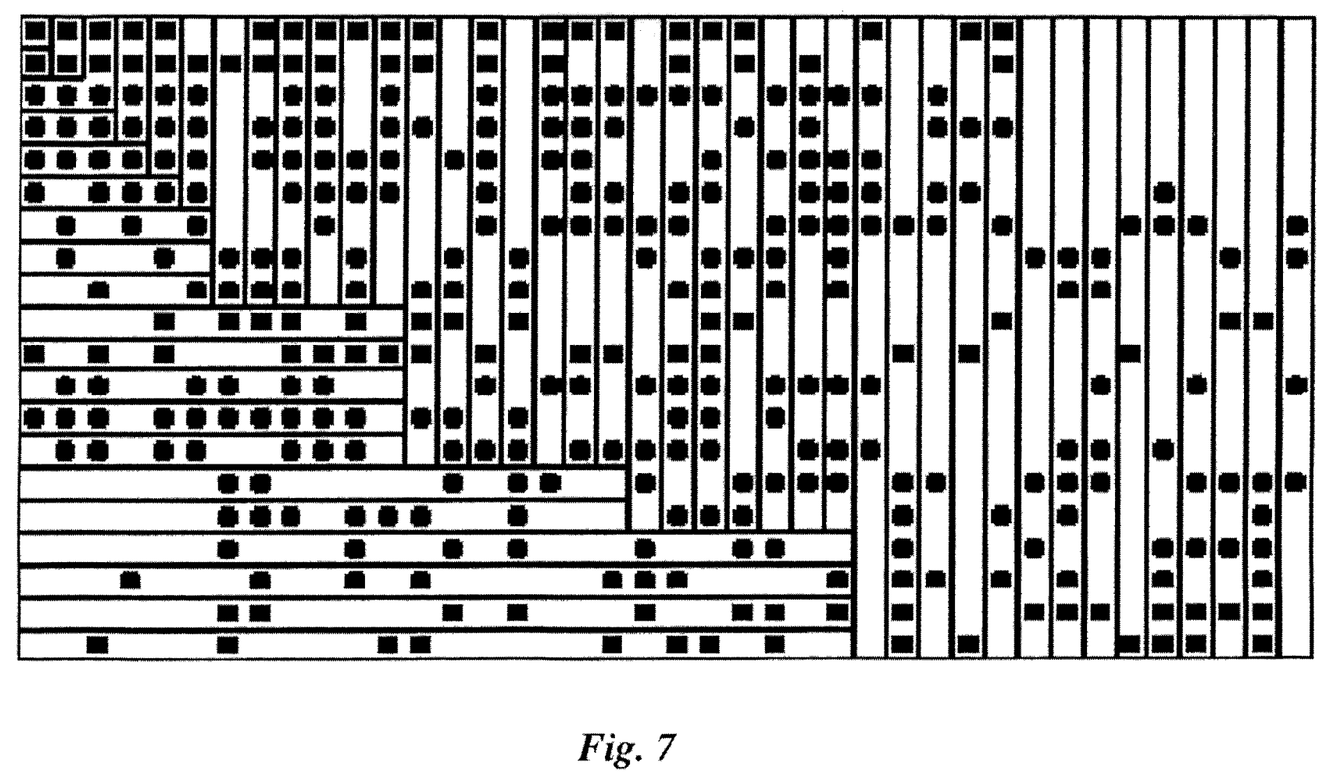
FIG. 7 is a block diagram or incomplete data reordered according to the invention.
Figure 8:
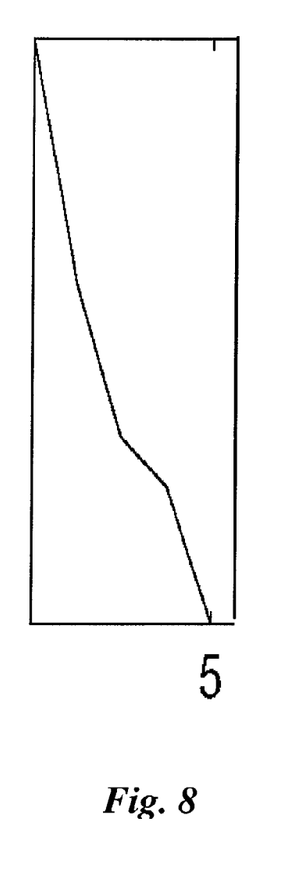
FIG. 8 is a graph of results of the SVD according to the invention.
Figure 9:
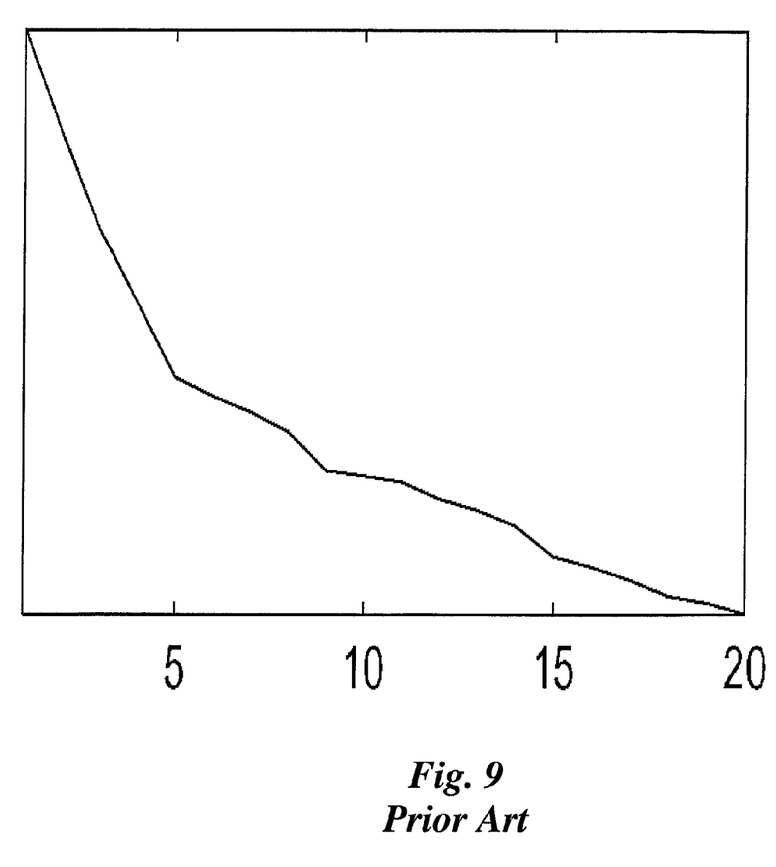
FIG. 9 is a graph of results of the prior art SVD.

FIG. 6 shows a rank-8 20×40 matrix with 75% of its entries (randomly) incomplete. That is, the incomplete data values are set to NaN, see above. Dots indicate entries having valid values. FIG. 7 shows how the matrix is rearranged and partitioned into partial rows and columns for the incremental SVD according to the invention. The pattern of bars shows the order of updates. As shown in FIG. 8, the incremental SVD yields a rank-5 decomposition, whereas a prior art batch SVD, as shown in FIG. 9, requires all twenty singular values to reconstruct the surviving data to machine precision. At best, truncating the batch SVD to rank 8 amplifies the residuals by $10^{14}$.

Example Applications

Collaborative Filtering

A collaborative filtering application takes an extremely sparse array of consumer-product scores and determines predictions of missing scores. Sarwar et al., see above, collected a 93.7% incomplete 943×1650 matrix of movie ratings on a 1-5 scale, and split the data 80%/20% into training and test sets. They filled missing data in the training matrix with column means, subtracted row means to normalize it, then performed a series of thin Lanczos SVDs. They found that a rank-14 basis best predicted the test set as measured by average absolute error (MAE) and mean-squared error. In a deployed prior art systems, the learning phase must be performed as a nightly batch operation due to the computational costs.

When their data are processed by the incremental SVD according to the invention, a rank-5 basis can be obtained that has even better prediction accuracy. Not surprisingly, an incremental SVD of the whole database indicated that the five largest singular values account for most of the variance in the data. The predictor is within one rating point of the true value more than 80% of the time, and within two points more than 99% of the time. The incremental method also has the practical advantages of being faster, e.g., 0.5 GFLOPs versus 1.8 GFLOPs for the prior art method. Thus, the method according to the invention enables real-time updating of the SVD as new movies or viewers are added to the database.

Figure 10:
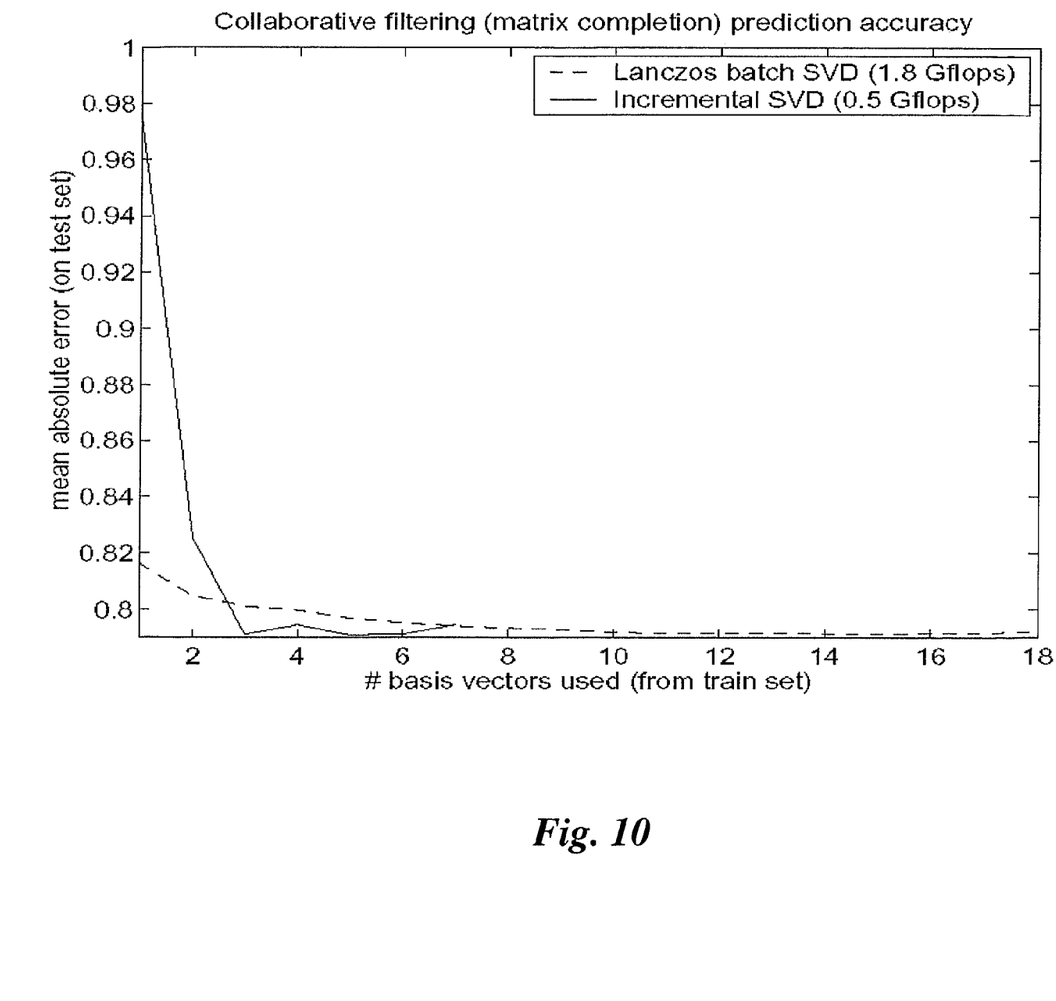
FIG. 10 is a graph comparing SVDs for a collaborative filtering application.

FIG. 10 compares the results obtained by the incremental SVD method, and the prior art batch Lanczos method. The training data set has 93.7% of all values missing. The incremental SVD method finds a 5-dimensional basis that bests the 15-dimensional basis found by the Lanczos method, after column imputations.

Effect of the Invention

The invention solves the problem of finding good low-rank characterization models of data sets that are extremely large, partly or mostly incomplete, contaminated with colored noise, and possibly even non-stationary. By combining an update rule with careful management of numerical noise, rank-minimizing imputations, and uncertainty transforms for maximum-a-priori inference with respect to measurement noise and user priors, the method is fast, accurate, and parsimonious. The method has better time and space complexity than widely used prior art batch SVD methods. Thus, the method can be used for semi-dense optical flow analysis on non-rigid surfaces for thousands of frames in a video, and for automatic handling of occlusion in structure-from-motion factorization problems.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A computer implemented method for modeling data values acquired by measuring a real-world phenomenon, comprising the steps of:

measuring a natural phenomenon to acquire a plurality of samples of the natural phenomenon, in which the samples are in a form of an extremely sparse array of consumer-product preference scores;

arranging each sample as a vector c of discrete data values in a matrix M stored in a memory of a computer system;

decomposing the plurality of vectors c of the matrix M into five matrices, respectively, a subspace $U_{pxr}$, singular values $s_{rxl}$, an encoding $V_{qxr}$, a subspace rotation $U'_{rxr}$, and an encoding transform $V'_{rxr}$, where p indicates the number of the discrete data values in each sample, q is a number of the samples, and r is a rank of a decomposition of the discrete data values;

multiplying the five matrices $UU'\,\mathrm{diag}(s)V'^T V^T$ obtain a best linear approximation of the real-world phenomenon for any value of the rank r less than both p and q, and where $^T$ is a matrix transpose operator; and predicting missing consumer-product preference scores using the best linear approximation in a collaborative filtering application.

2. The method of claim 1 wherein the data samples are incomplete.

3. The method of claim 1 wherein the decomposition is incrementally updated one vector c at the time.

4. The method of claim 1 further comprising:

normalizing a first vector c to obtain the subspace U and a length of the subspace U;

setting the singular values s to a length of the vector C; and setting the encoding V, the subspace rotation U', and the encoding transform $V'^T$ all to one to initialize the decomposition.

5. The method of claim 4, further comprising, for each next vector:

projecting each next vector c onto the subspace U to obtain a location L of the vector c in the subspace U;

unprojecting the location L and subtracting the unprojected location L from the original vector c to obtain a remainder p of the vector outside the subspace, and a length k of the remainder p;

concatenating the location L and the length k of the remainder to the singular values s to obtain interim singular values $s^i$;

diagonalizing the interim singular values $s^i$ to obtain updated singular values matrix s', and a left rotation $s_L$ and a right rotation $s_R$ of the updated singular values matrix s';

multiplying the subspace rotation U' by the left rotation $s_L$ to update the subspace rotation U' and multiplying the encoding transform V' by the right rotation $s_R$ to update the encoding transform $V'^T$;

normalizing the remainder vector p to have unit length;

appending the normalized remainder p to the subspace matrix U;

multiplying a last row of the right rotation $s_R$ by a Moore-Penrose pseudo-inverse of the encoding transform V' to obtain an encoding q of the next vector c; and appending the encoding q encoding to the encoding matrix V to incrementally update the decomposition.

6. The method of claim 5 further comprising:

truncating all five matrices to force a decomposition of low dimensionality.

7. The method of claim 5 further comprising:

multiplying U by U' and V by V' to obtain a singular value decomposition.

8. The method of claim 7 further comprising:

swapping U and V and setting U' and V' to identity matrices to transpose the decomposition and enabling updating with data value rows instead of data value columns.

9. The method of claim 8 further comprising:

updating row-wise and column-wise to defer imputations of the missing data values until the imputations are well-constrained.

10. The method of claim 5 wherein the vector c has known data values and missing data values, and further comprising:

multiplying known data values of the vector c by the Moore-Penrose pseudo-inverse of a subset of rows of the subspace U to obtain the location L of the vector c in the subspace U when the vector c is incomplete.

11. The method of claim 10 further comprising:

weighting the pseudo-inverse with the singular values s to maximize a probability of the multiplication.

12. The method of claim 10, wherein the unprojection of the location L is an imputation of the missing data values.

13. The method of claim 12, wherein the data values are organized as a table of affinities, and the imputation is used to recommend pairs of items that have a high affinity.

14. The method of claim 1, wherein the rank r is substantially less than p and q, $r \ll \min(p, q)$.

15. The method of claim 1, wherein the matrix M is extremely sparse.

16. The method of claim 1, wherein the samples include colored noise.

17. The method of claim 1, wherein the samples are non-stationary.

18. The method of claim 1, wherein the approximation characterizes the natural phenomenon with a lowest possible rank.

19. The method of claim 1, in which the samples are of an audio signal, and the approximation characterizes audio features of the audio signal.

* * * * *